United States Patent Office 3,227,775
Patented Jan. 4, 1966

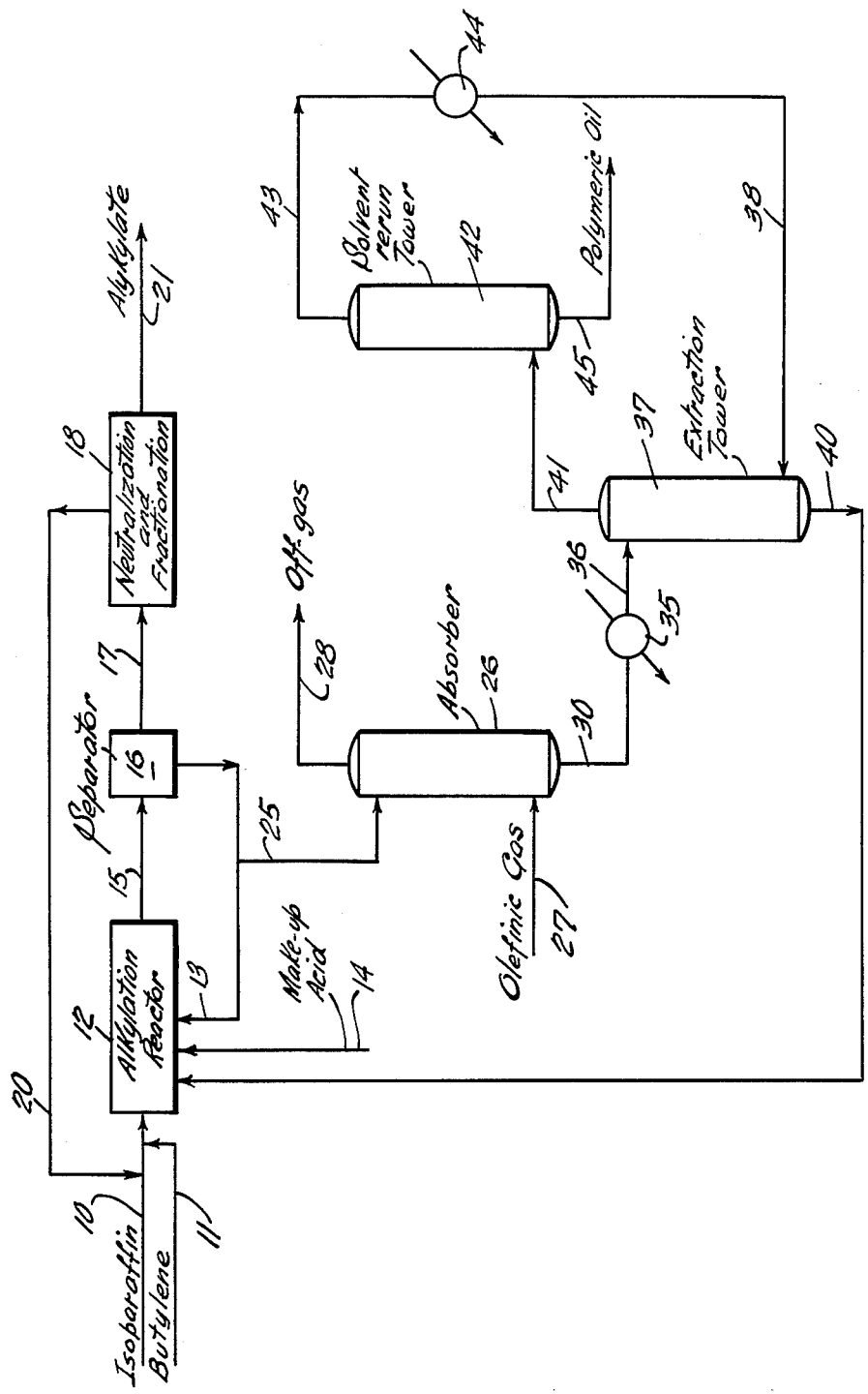

3,227,775
SULFURIC ALKYLATION ACID RECOVERY
Arthur R. Goldsby, Chappaqua, N.Y., assignor to Texaco Development Corporation, New York, N.Y., a corporation of Delaware
Filed Jan. 26, 1965, Ser. No. 429,947
18 Claims. (Cl. 260—683.62)

This application is a continuation-in-part of my copending application, Ser. No. 208,350, filed July 9, 1962, now abandoned.

This invention is directed to a hydrocarbon conversion process. More particularly, it is directed to a method of alkylating an isoparaffin with olefin and olefinic feed stocks in the presence of a sulfuric acid catalyst wherein the catalyst is continuously revivified in an integrated system. In the course of the alkylation of isoparaffins with olefins, sulfuric acid catalyst becomes contaminated with a polymeric organic contaminant which impairs the catalyst activity. This contaminant is believed to be a product of conjunct polymerization, that is, polymerization of the reactants accompanied by hydrogen transfer reactions. This material is variously referred to as "acid oil," "polymeric oil," "acid-soluble sludge," or as a "complex." It appears to be a complex mixture, the exact composition of which is unknown. Its composition no doubt varies somewhat depending on the composition of the feed stock and the reaction conditions. This polymeric organic contaminant is soluble or chemically bound by strong sulfuric acid but is insoluble in acid diluted to less than about 50 percent acid by weight with water. In accordance with the usual procedures of the prior art, this organic polymeric contaminant is eliminated from the alkylation system by withdrawing acid of about 85 to 92 percent concentration as "spent acid" from the alkylation system at the rate of about 0.4 to 1.5 pounds per gallon of alkylate produced and replenishing the system with fresh acid of about 98.0 to 99.9 percent acid. Since the polymeric organic contaminant amounts to only about 3 to 8 percent of the spent acid, a large amount of acid must be disposed of in order to eliminate a relatively small amount of the polymeric organic contaminant from the system. It has previously been attempted to separate the polymeric organic contaminant from the acid by various methods unsuccessfully, including the use of solvent extraction, contacting with a solid absorbent, salting out, vacuum distillation, and treatment with various chemicals. In accordance with the process of this invention, acid is recovered by reacting a portion with an olefin forming alkyl esters, and the resulting absorption product is contacted with a light hydrocarbon at a low temperature below about 40° F. and preferably within the range of 20 to 40° F., effecting extraction of polymeric organic contaminants from a raffinate comprising alkyl esters and remaining unreacted sulfuric acid. It appears that reaction of olefin with the acid depletes the acid so that the concentration of remaining acid is reduced and the contaminants are rendered less tightly held by the acid. If approximately two mols of olefin per mol of acid are absorbed by the acid, it appears that substantially all of the acid is converted to alkyl sulfates, and predominately the dialkyl sulfates. It has been discovered that the organic contaminants are soluble in light hydrocarbons at low temperatures whereas dialkyl esters, although soluble at temperatures above about 40° F., are relatively insoluble below that temperature. The alkyl acid sulfates are relatively insoluble over a wide temperature range. It is therefore possible to extract selectively the polymeric organic contaminants from acid containing dissolved alkyl esters by countercurrent contact with a hydrocarbon at a temperature below 40° F. Raffinate acid phase containing alkyl esters is then returned to the alkylation system.

The returned raffinate acid is free of or greatly reduced in polymeric organic contaminants and the dissolved alkyl esters are converted to alkylate and released sulfuric acid by reaction with isoparaffin in the alkylation zone. Solvent hydrocarbon containing extracted polymeric organic contaminants is separated and reused. The hydrocarbon solvent may be separated from the organic polymeric contaminant by distillation, absorption, reaction with fresh or spent alkylation acid, or by re-extraction. The separation should be carried out to minimize any loss of alkyl sulfates, and preferably any alkyl sulfates extracted should be left in the solvent and recycled to the extraction step.

With this invention substantially all of the constituents of the spent alkylation acid other than the polymeric oil, including the water, are returned to the alkylation reactor. Hence, it is important to keep the water in the fresh make-up acid and in the hydrocarbon feed streams at a minimum value. Sufficient spent alkylation acid may be discarded to keep the water content of the system alkylation acid at a desirable level, for example 2.0 to 3.5%.

In the catalytic alkylation of olefinic material with isoparaffins, a preponderance of isoparaffin (generally as much as 60 to 80 volume percent or more of the hydrocarbons in the reaction mixture) is used to direct the reaction towards production of the most valuble aviation or automotive fuels. Consequently a large quantity of isoparaffin must be recovered and recycled for reuse in the process. Isobutane is generally used as the isoparaffin for the manufacture of aviation or motor fuels although other isoparaffins, for example isopentane, may be employed.

In sulfuric acid alkylation, the mol ratio of isoparaffin to olefinic material supplied to the alkylation zone is maintained substantially in excess of 1 to 1, and preferably within the range of about 4 to about 20 to 1. The catalyst to liquid hydrocarbon volume ratio is maintained within the range of about 0.5 to 1 to about 5 to 1 and preferably within the range of about 1 to 1 to about 3 to 1. Catalyst strength in the alkylation zone is preferably maintained at least about 85% sulfuric acid strength.

An important part of the isobutane employed in alkylation processing is a recycle stream produced by fractional distillation of alkylation products in a deisobutanizing fractional distillation zone wherein the isobutane is recovered as a distillate fraction of high isobutane concentration, for example, about 85 to 95 liquid volume percent isobutane. The high-boiling alkylate in such distillation zone may be recovered as a bottoms fraction. This bottoms fraction may be further fractionated in conventional manner to separate light ends and alkylate fractions for use as fuel blending stocks. However, in most modern units, the alkylate produced is satisfactory for motor fuel without fractionation having an end point well below 400° F.

In accordance with the process of this invention the olefinic material reacted with an isoparaffin in the alkylation zone comprises a mixture of olefins and alkyl esters. Alkyl esters are produced by reaction of alkylation acid with olefin in a separate absorption step. The absorption product comprising alkyl esters and unreacted acid is treated effecting separation of polymeric organic contaminants.

Olefins, for example, propylene, butylenes, or mixtures of olefins, may be reacted with sulfuric acid, including acid of less than alkylation strength, to form alkyl esters. Olefins having at least three carbon atoms in the chain predominantly form branched chain esters, although a small amount of normal esters may be formed. The reaction mixture formed upon contacting a hydrocarbon stream containing mixed olefins with sulfuric acid comprises a complex mixture of mono- and diesters containing straight chain and branched chains. In the case of the diesters, the chains may be of the same or different lengths.

In maintaining catalyst strength in sulfuric acid catalyzed alkylation, it is generally necessary to withdraw acid at a rate of about 0.4 to 1.5 pounds per gallon of alkylate produced. The acid withdrawn may have a composition for Example, of 90.0 weight percent $H_2SO_4$, 2.0 weight percent water and 4.4 weight percent polymeric organic contaminants. The purpose of withdrawing the spent acid is to reject the water and contaminants, and this stream is reprocessed to recover the remaining acid. In accordance with the process of this invention, 50 to 95 percent of the sulfuric acid contained in spent acid is recovered in the form of dialkyl sulfates. Upon separation and alkylation of this dialkyl sulfate, sulfuric acid of 100 percent strength is liberated in the reaction zone so that the make up acid rate may be reduced to about 10 to 50 percent of that otherwise necessary.

Advantageously, spent sulfuric acid catalyst may be employed to extract alkylatable olefin from hydrocarbon streams in which the olefin is too dilute for inclusion directly in alkylation feed. For example, a hydrocarbon stream containing only about 10 to 30 percent propylene may be contacted with spent sulfuric acid catalyst to effect separation of the olefin as dipropyl sulfate from the remaining saturated hydrocarbons as well as from ethylene which is desirably excluded from alkylation feed to avoid excessive catalyst consumption. Olefin streams containing a higher percentage of propylene, such as those produced by catalytic cracking, are also suitable. Selective separation of propylene from ethylene containing streams is readily effected since the absorption rate of propylene in sulfuric acid is about 300 times that of ethylene for acid concentrations of 80 percent and higher.

The absorption step may be effected in contacting equipment well known in the art, for example, mixer-settlers, centrifugal contactors, or countercurrent towers. Countercurrent contacting is preferred and is advantageously effected in countercurrent towers with either gaseous or liquid olefin containing hydrocarbon streams. In either case olefin containing hydrocarbon is introduced into the bottom of the tower and lean hydrocarbon is discharged from the top. Sulfuric acid introduced into the top of the tower is relatively strong effectively stripping remaining olefin from the exit hydrocarbon. As the acid descends through the column, it is consumed by reaction with olefin so that at the bottom of the tower the acid is relatively weak, and is rich in alkyl sulfates. The relatively weak acid in contact with the most concentrated olefin tends to favor the formation of dialkyl sulfate by converting the alkyl acid sulfate to the diester. However, in some cases, it is advantageous to have the olefin in the top of a countercurrent tower contact acid containing some absorbed olefin, in order to minimize undesirable reactions of the olefins.

The absorption temperature is desirably maintained within a range of about 20 to 100° F. Since a substantial amount of heat is released upon absorption of olefins in acid, it is necessary to cool the absorption step to maintain the temperature within the desired range. Cooling of the absorption step is effected by cooling the feed streams to the absorption tower and/or by cooling material within the absorption step either by evaporative cooling or by indirect heat exchange methods. Liquid may be withdrawn from the absorption system, cooled by indirect heat exchange, and returned to the absorber. Coolant may be supplied by a separate refrigeration system or may be effected with a process stream. In one embodiment of this process, hydrocarbon effluent from the alkylation reaction zone is flashed before or after separation of acid effecting vaporization of a part of the hydrocarbon liquid and cooling of the resulting liquid and vapor mixture. The resulting chilled mixture is passed in indirect heat exchange with a stream of the absorption reaction mixture to effect cooling thereof.

Absorption product comprising alkyl sulfates, polymeric organic contaminants and remaining unreacted acid is withdrawn from the absorption zone. The absorption product is then contacted with an organic solvent preferably a liquid hydrocarbon for example liquid propane or isobutane at a temperature below about 40° F. Extraction temperatures within the range of —2.2° F. to 40° F. and preferably within the range of 20 to 40° F. are employed. In the extraction step the polymeric organic contaminants are selectively separated from remaining acid and dissolved alkyl sulfate.

The extraction step may be effected in contacting equipment known in the art, for example, mixer-settlers, centrifugal contactors or countercurrent towers. Selective extraction of polymeric organic contaminants from the remaining acid and dissolved alkyl esters is readily effected with a hydrocarbon liquid at temperatures below about 40° F. In a countercurrent tower the absorption product is introduced at the top and raffinate is discharged from the tower bottom. The hydrocarbon solvent is introduced at the bottom and extract mixture comprising the polymeric organic contaminants is removed at the top.

The temperature of the extraction zone may be controlled by cooling the absorption product passed to the top of the extractor or by cooling the hydrocarbon solvent passed to the bottom of the extractor, by cooling both streams, or by the use of indirect heat exchange of materials within the extraction zone.

Hydrocarbon solvent may be separated from the polymeric organic contaminants by distillation in a rerun tower, or by simple flashing. Advantageously the heat for such a distillation may be obtained as indirect heat from other steps in the alkylation process for example by indirect heat exchange with distillation overhead in the fractionation equipment. Another method of separating hydrocarbon solvent from the polymeric organic contaminant is by passing the mixture over a solid absorbent such as charcoal, alumina, silica-gel or clay. Catalyst discarded from catalytic cracking has high absorption capacity and may be used for separation of the polymeric organic contaminant. In another method of separating the polymeric organic contaminant, the solvent hydrocarbon and contaminant may be contacted with concentrated sulfuric acid or spent alkylation acid effecting re-extraction of the polymeric organic contaminant.

Hydrocarbon solvents preferred in the process of this invention include liquefied propane, and isobutane. Although the solubility of the alkyl sulfates is quite low in these solvents below about 40° F., the extraction of alkyl sulfates may be further minimized by using a solvent substantially saturated at the extraction temperature with the dialkyl sulfate or sulfates derived from the olefin or olefins being charged to absorber. Since the polymeric contaminant is so much more soluble in the solvents than the alkyl sulfates, a minimum amount of solvent should be used. Usually 1 to 3 volumes of solvent per volume of absorption mixture, or less, are sufficient.

An object of the process of this invention is to provide an improved alkylation process. Another object is to recover spent sulfuric acid alkylation catalyst for reuse in alkylation. Another object is to provide a method of separating polymeric organic contaminants from an alkylation system. These and other objects will appear in the following description of the figure and example.

The accompanying drawing diagrammatically illustrates one form of the process of this invention. Although the drawing illustrates one arrangement of apparatus in which the process of this invention may be practiced, it is not intended to limit the invention to particular apparatus or material described.

Isobutane in line 10 and from recycle line 20 are admixed with butylenes in line 11 and the mixture passed to alkylation reactor 12. Sulfuric acid is introduced into reactor 12 from line 13. Isobutane, butylene and acid are contacted with vigorous agitation forming an emulsion. Effluent emulsion from reactor 12 is withdrawn through line 15 to acid separator 16. Separated acid catalyst is withdrawn through line 13 for return and make-up acid as required is separately added to the alkylation reactor through line 14. Advantageously, the fresh make-up acid which may be at ambient atmospheric temperature is cooled to a temperature below 60° F. before addition to the recycle acid or to the alkylation reactor. The fresh acid may be cooled by indirect heat exchange with a cold stream such as recycle acid or reactor effluent or by direct heat exchange by mixing with a cold hydrocarbon stream passed to the alkylation reactor, for example, flashed isobutane. One advantageous means of obtaining indirect heat exchange is to introduce the make-up acid into the reactor through a line jacketed by a line through which cold recycle acid or cold hydrocarbon is introduced. Separated hydrocarbons are passed through line 17 to neutralization and fractionation facility 18. Isobutane separated in fractionation facility 18 is recycled through line 20 to the alkylation reactor with fresh isobutane in line 10. Alkylate product is withdrawn through line 21.

A portion of the acid in line 13 is withdrawn through line 25 and introduced at the top of absorber 26. An olefinic gas stream comprising predominantly propylene and propane together with a small amount of ethylene, propane, butylene, and butane is introduced into the bottom of absorber 26 through line 27. In absorber 26, propylene, and butylenes are reacted with sulfuric acid forming alkyl sulfates and remaining hydrocarbons including ethylene, propane and butane are discharged as off-gas through line 28. Absorption product comprising alkyl esters, polymeric organic contaminants and remaining unreacted acid is withdrawn through line 30.

Absorption product is cooled to a temperature of 30° in cooler 35 and passed through line 36 to extraction tower 37. Cold hydrocarbon solvent comprising isobutane at a temperature of 30° in line 38 is introduced at the bottom of tower 37. The absorption product and alkylate are counter-currently contacted in tower 37 effecting extraction of polymeric organic contaminants from the absorption product. Extraction tower bottoms comprising alkyl esters and sulfuric acid is withdrawn from the bottom of tower 37 through line 40 and passed to alkylation reactor 12. Extract comprising hydrocarbon solvent and dissolved polymeric organic contaminant is withdrawn through line 41 and passed to solvent rerun tower 42. In solvent rerun tower 42, the hydrocarbon solvent is distilled as an overhead fraction through line 43 and cooled in cooler 44 for return to extraction tower through line 38. Organic polymeric contaminant is withdrawn through the bottom of rerun tower 42 through line 45 for use or disposal as fuel (not shown).

Alternatively, at least a part of the hydrocarbon solvent may be added to the absorption mixture at a temperature above 40° F. and the mixture then cooled to a suitable extraction temperature. For example, the absorption product and hydrocarbon solvent may be admixed at a temperature of about 120° F. or higher where the two streams are virtually miscible and then cooled to separate extract and raffinate phases. The separated raffinate phase comprising alkyl sulfates may then be passed directly to the alkylation reactor or may be passed to a countercurrent extraction step to effect more complete removal of polymeric organic material before charging to the alkylation step. In one embodiment of this invention, the absorption mixture is contacted with a normally gaseous hydrocarbon such as isobutane at a pressure such that the entire mixture is in the liquid phase at a temperature of about 100° F. and the mixture is then flashed into a zone of lower pressure whereby a portion of the hydrocarbon is evaporated and the resulting vapor-liquid mixture cooled to a temperature below 40° F. The resulting chilled liquid is then passed to a phase separator as above and the vapor is compressed and condensed with the vapor from the solvent rerun tower.

EXAMPLE

In an example of the process of this invention, 600 barrels per day of butylene, 12,000 barrels per day of isobutane, 2,661 pounds per day of 99.5 weight percent sulfuric acid, and 57,469 pounds per day of absorption product comprising 56,804 pounds per day of alkyl sulfates are charged to an alkylation contactor. The alkylation zone is maintained at a pressure of 60 p.s.i.g. and a temperature of 40° F. Alkylate product having an ASTM distillation range of 115° F. to 360° F., and an ASTM octane number of 94.5 is produced at a rate of 1,267 barrels per day. Acid of 92.0 percent concentration containing 4.4 weight percent polymeric organic contaminants is withdrawn from the alkylation system at a rate 33,247 pounds per day and contacted with a gas stream containing propylene at a rate of 141 barrels per day in a countercurrent absorption tower. A small amount of 92.0% acid from the alkylation reactor amounting to 2,882 pounds per day is discharged from the alkylation reactor to keep the water content of the system alkylation acid at a low level. The countercurrent absorption tower is maintained at a maximum temperature of 60° F. by pre-chilling of the charge acid and by evaporative cooling of the gas stream. Absorption product comprising 56,804 pounds per day of propylsulfates is cooled to 25° F. and passed to an extraction tower. In the extraction tower the absorption product is countercurrently contacted with isobutane at 25° F. and at a rate of 410 barrels per day. Extracted absorption product is passed to the alkylation reaction zone and the isobutane containing polymeric organic contaminants is contacted with bauxite effecting absorption of the organic polymeric contaminant. Bauxite treated isobutane is recycled to the extraction tower. The bauxite is periodically regenerated by steaming to separate the absorbed polymeric organic contaminant.

I claim:

1. In a process wherein an isoparaffin is alkylated with an olefin and an alkyl sulfate in the presence of a sulfuric acid catalyst in an alkylation zone wherein said catalyst becomes contaminated with polymeric organic material, the improvement which comprises:
   contacting an olefin with used alkylation acid containing polymeric organic contaminants effecting formation of an absorption product comprising alkyl sulfates,
   contacting said absorption product with a hydrocarbon solvent at a temperature below about 40° F. effecting extraction of at least a portion of said polymeric organic contaminants,
   separating raffinate comprising alkyl sulfates and sulfuric acid, and
   passing said raffinate to said alkylation zone.

2. The process of claim 1 wherein said hydrocarbon solvent is selected from the group consisting of liquid propane and liquid isobutane.

3. The process of claim 1 wherein said hydrocarbon solvent containing extracted polymeric organic contaminants is contacted with sulfuric acid effecting re-extraction of said polymeric organic contaminants and regeneration of said hydrocarbon solvent.

4. The process of claim 1 wherein said hydrocarbon solvent containing extracted polymeric organic contaminants is contacted with solid adsorbent effecting adsorption of said polymeric organic contaminants and regeneration of said hydrocarbon solvent.

5. The process of claim 1 wherein said hydrocarbon solvent containing extracted polymeric organic contaminants is distilled effecting separation of said hydrocarbon solvent from said polymeric organic contaminants.

6. The process of claim 1 wherein said adsorption product is contacted with said hydrocarbon solvent at a temperature within the range of 20 to 40° F.

7. The process of claim 1 wherein said used alkylation acid containing polymeric organic contaminants is contacted with olefin in a mol ratio of two mols of olefin per mol of acid.

8. The process of claim 1 wherein fresh make-up acid is separately added to said alkylation zone at a temperature below 60° F.

9. In a process wherein an isoparaffin is alkylated with propylene and butylene in the presence of a sulfuric acid catalyst, the improvement which comprises:
   contacting an olefinic feed stock comprising butylene with an isoparaffin in the presence of said sulfuric acid catalyst in an alkylation zone wherein said catalyst becomes contaminated with polymeric organic contaminant,
   withdrawing a portion of said catalyst containing said polymeric organic contaminant,
   contacting said catalyst containing polymeric organic contaminant with an olefinic feed stock comprising propylene effecting formation of an absorption product comprising dipropyl sulfate,
   contacting said absorption product with a hydrocarbon solvent selected from the group consisting of propane and isobutane at a temperature within the range of about 20 to about 40° F. effecting extraction of at least a portion of said polymeric organic contaminant from a raffinate comprising dipropyl sulfate, and
   passing said raffinate to said alkylation zone.

10. In a process wherein isobutane is alkylated with an olefin and alkyl sulfate in the presence of a sulfuric acid catalyst in an alkylation zone wherein said catalyst becomes contaminated with polymeric organic material, the improvement which comprises:
   contacting propylene with used alkylation acid containing polymeric organic contaminants effecting formation of an absorption product comprising alkyl sulfates,
   contacting said absorption product with isobutane at a temperature below about 40° F. effecting extraction of at least a portion of said polymeric organic contaminants,
   separating raffinate comprising alkyl sulfates and sulfuric acid, and
   passing said raffinate to said alkylation zone.

11. In a process wherein an isoparaffin is alkylated with an olefin and an alkyl sulfate in the presence of a sulfuric acid catalyst in an alkylation zone wherein said catalyst becomes contaminated with polymeric organic material, the improvement which comprises:
   contacting an olefin with used alkylation acid containing polymeric organic contaminants effecting formation of an absorption product comprising alkyl sulfates,
   contacting said absorption product with a hydrocarbon solvent at a temperature above 40° F. forming a solvent-absorption product mixture,
   cooling said solvent-absorption product mixture to a temperature below 40° F. effecting formation of an extract phase containing at least a portion of said polymeric organic contaminants and a raffinate phase comprising alkyl sulfates and sulfuric acid,
   separating said raffinate from said extract, and
   passing said raffinate to said alkylation zone.

12. The process of claim 11 wherein said absorption product is contacted with said hydrocarbon solvent at about 100 to 120° F.

13. The process of claim 11 wherein said hydrocarbon solvent is selected from the group consisting of liquid propane and liquid isobutane.

14. The process of claim 11 wherein said extract containing extracted polymeric organic contaminants is contacted with sulfuric acid effecting re-extraction of said polymeric organic contaminants and regeneration of said extract.

15. The process of claim 11 wherein said extract containing extracted polymeric organic contaminants is contacted with solid adsorbent effecting adsorption of said polymeric organic contaminants and regeneration of said extract.

16. The process of claim 11 wherein said extract containing extracted polymeric organic contaminants is distilled effecting separation of said extract from said polymeric organic contaminants.

17. The process of claim 11 wherein said adsorption product is contacted with said hydrocarbon solvent at a temperature within the range of about 100 to 120° F. and the resulting mixture is cooled to a temperature within the range of about 20 to 40° F.

18. In a process wherein an isoparaffin is alkylated with an olefin and an alkyl sulfate in the presence of a sulfuric acid catalyst in an alkylation zone wherein said catalyst becomes contaminated with polymeric organic material, the improvement which comprises:
   contacting an olefin with used alkylation acid containing polymeric organic contaminants effecting formation of an absorption product comprising alkyl sulfates,
   contacting said absorption product with a normally gaseous hydrocarbon at a temperature above 40° F. and at a pressure such that the entire hydrocarbon-absorption product mixture is in the liquid phase,
   passing said hydrocarbon-absorption product mixture to a zone of lower pressure effecting concomitant evaporation of a portion of said hydrocarbon and chilling of the resulting liquid-vapor mixture to a temperature less than 40° F.,
   separating chilled liquid comprising an extract phase containing at least a portion of said polymeric organic contaminants and a raffinate phase comprising alkyl sulfates and sulfuric acid,
   separating said raffinate from said extract, and
   passing said raffinate to said alkylation zone.

References Cited by the Examiner
UNITED STATES PATENTS

| | | | |
|---|---|---|---|
| 2,381,041 | 8/1945 | De Jong | 260—683.61 |
| 3,000,994 | 9/1961 | Watson | 260—683.61 |
| 3,038,948 | 6/1962 | Trow | 260—683.45 |
| 3,083,247 | 3/1963 | Goldsby et al. | 260—683.46 |

DELBERT E. GANTZ, *Primary Examiner.*